March 23, 1965  DAIJIRO MATSUI  3,175,133
VARIABLE DISK CAPACITOR
Filed March 14, 1962
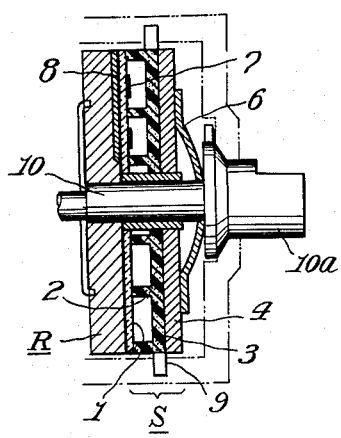
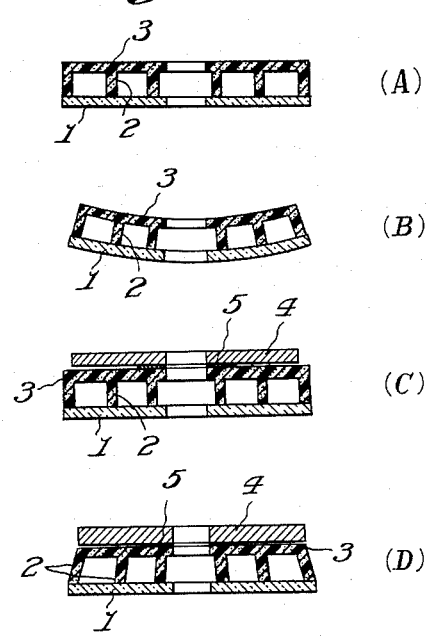
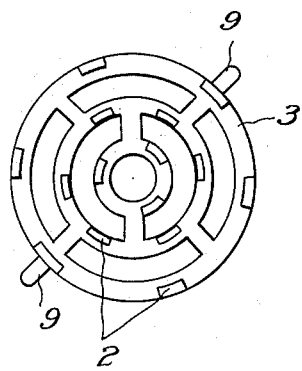
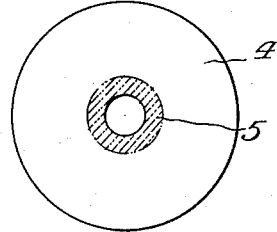

3,175,133
VARIABLE DISK CAPACITOR
Daijiro Matsui, Tokyo-to, Japan, assignor to Kabushiki Kaisha Toko Radio Coil Kenkyusho, Tokyo-to, Japan, a joint-stock company of Japan
Filed Mar. 14, 1962, Ser. No. 179,755
Claims priority, application Japan, Mar. 16, 1961, (utility model), 36/13,059
1 Claim. (Cl. 317—249)

This invention relates to electrical variable capacitors. More particularly it relates to a new variable capacitor, adaptable to miniaturization, of the type wherein one electrode is printed on the surface on one side of a thin plate of dielectric material, such as ceramic, and adapted to be exposed, through the said thin dielectric plate, to an opposite electrode in an overlapping manner, and, by adapting the said opposite electrode to operate as a rotor (or a stator), the overlapping, exposed area between the two said electrodes is adjustably varied to vary the capacitance of the capacitor.

In prior variable capacitors of miniature size of such a type, since their dielectric plates are extremely thin, support means for supporting these thin plates have been required. However, since the coefficients of thermal expansion of each dielectric plate and of its support means are not the same, deformation such as curving or warping has been caused by temperature changes. As a result, irregular spacing has been created between the dielectric plate and the opposite electrode, the said result having a seriously detrimental effect on the performance of the capacitor.

It is an object of the present invention to provide a new, miniature, variable capacitor wherein the above-described disadvantage of prior variable capacitors of like type is eliminated.

More specifically, it is an object of the invention to provide a variable capacitor of this type in which the dielectric material does not curve or warp with changes in temperature, and the gap between the dielectric material and the opposite electrode is constantly maintained in a uniform state.

Said objects and other objects of this invention have been attained by a construction wherein a dielectric member such as ceramic is bonded to the tips of a plurality of struts provided on a support member made of such a material as synthetic resin with elastic property, and only one part of a retaining plate interposed between the other surface of the said support member and a pressure spring is bonded to the said support member.

The nature of the invention, its details, and the manner in which the foregoing object may best be achieved will be more clearly apparent by reference to the following description of a representative embodiment of the invention when taken in conjunction with the accompanying drawing in which like parts are designated by like reference numerals and letters, and in which:

FIG. 1 is a partly sectional view taken along a vertical plane passing through the axis of the rotor shaft, showing one embodiment of this invention in assembled state;

FIG. 2 consists of sectional views taken along a plane passing through the central axis of the dielectric plate of the embodiment of FIG. 1, showing the effect of temperature on the dielectric material and its support member;

FIG. 3 is a view in the axial direction showning a support member for supporting a dielectric material, suitable for use in the embodiment shown in FIG. 1; and FIG. 4 is a view in the axial direction showing a retaining plate suitable for use in the embodiment shown in FIG. 1.

Referring to the drawing, especially to FIG. 1, the embodiment of the invention comprises, essentially a stator S, a rotor R, and a rotor shaft 10 provided with a knob 10a. The rotor R is fixed to the shaft 10, and by which it is caused to rotate relative to the stator S. The stator S and the rotor R, in assembled state, are maintained in mutual, compressive contact at their sliding surfaces by a pressure spring 6.

An important feature of the present invention exists in the construction of the stator S, wherein a dielectric member 1, of such a material as ceramic, is bonded to the tips of a plurality of struts 2 provided on a support member 3 made of a material, such as a synthetic resin, with elastic property, and only a certain part 5 (refer to FIGS. 2(C) and (D) and FIG. 4) of a retaining plate 4 interposed between the support member 3 and the pressure spring 6 is bonded to the said support member 4.

The electrode on the stator side is in the form of an electrode 7 printed on the surface of the dielectric member 1 away from the rotor R. The rotor R is provided with the opposite electrode 8. The stator is fixed in installed position by lugs 9 fixed to the support member 3.

The principle of the unique construction of the stator of the instant embodiment will now be described with reference to FIG. 2. If the support member 3 is bonded to the dielectric member 1 at a temperature of, as an assumption, 70° C. as indicated in FIG. 2(A), the support member 3, at normal temperature, will contract and become curved as indicated in FIG. 2(B), and the curving of the dielectric member bonded thereto cannot be avoided. Then, if the temperature of the parts is returned to the above-stated bonding temperature to cause the two parts to assume their state indicated in FIG. 2(A), and one part of a retaining plate 4 is bonded to the support member 3 as indicated in FIG. 2(C), the support member 3 will be held by the retaining plate 4 and be prevented from becoming curved or warped even when the parts return to normal temperature, whereby the dielectric member 1 can be maintained in a planar state, as indicated in FIG. 2(D).

As described above, when the retaining plate 4, instead of being bonded over its entire contact area to the support member 3, is merely bonded at only one part 5 thereof, the curving of the support member 3 is prevented with the retaining plate 4 always in an independent state relative to the support member 3.

For the purpose of description, the foregoing two bonding steps have been described as taking place separately, but it will be obvious that they may be accomplished simultaneously with equal effect.

Furthermore, the bonded part of the retaining plate 4 need not be limited to the annular, shaded portion 5 as shown in FIG. 4 but may be some other suitable part. Still further, the support member 3 may be a mere flat plate on which struts 2 are provided, or, as shown in FIG. 3, it may be formed with certain cut-out portions for even greater effectiveness due to pliability and elasticity.

By the above-described construction, the dielectric member 1 is prevented from curving or warping with change in temperature. Moreover, since the dielectric member 1 is supported, with a certain amount of freedom to expand and contract, by elastic struts 2, it has a substantial degree of freedom in all directions except the rotational direction of the rotor and is caused by the force of the spring 6 to adapt its contacting orientation according to the flat surface of the opposite electrode 8. Accordingly, the gap between the dielectric member 1 and the opposite electrode 8 is constantly maintained in a uniform state. By the application of the present invention as set forth in the foregoing disclosure, it is possible to provide a variable capacitor of the instant type with greatly improved performance.

Although this invention has been described with respect to a particular embodiment thereof, it is not to be so limited as changes and modifications may be made therein which are within the full intended scope of the invention, as defined by the appended claim.

What is claimed is:

A warp-proof variable capacitor suitable for miniaturization which comprises, in combination, a stator; a rotor disposed opposite said stator; a shaft affixed to said rotor for moving said rotor relative to said stator; spring means for urging said stator onto said rotor to provide close contact therebetween; electrodes disposed on the opposing faces of said rotor and said stator; said stator consisting essentially of an elastic support member, a plurality of struts extending downwardly from said support member substantially at right angles; a ceramic dielectric plate facing said rotor and carrying the stator electrode, said plate resting on the tips of said struts; a retaining plate affixed, but only in part, to the upper surface of said support member opposite said struts, and said spring means being affixed to said retaining plate; the assembly of retaining plate, support member, struts and ceramic plate being capable of expanding and contracting under varying heat conditions without warping and curving.

References Cited by the Examiner
FOREIGN PATENTS 726,958  3/55  Great Britain.

LARAMIE E. ASKIN, *Primary Examiner.*

JOHN P. WILDMAN, JOHN F. BURNS, *Examiners.*